US009227266B2

(12) United States Patent
Hasegawa et al.

(10) Patent No.: US 9,227,266 B2
(45) Date of Patent: Jan. 5, 2016

(54) SEAM WELDING WARPAGE PREVENTION METHOD AND APPARATUS

(75) Inventors: Eisaku Hasegawa, Tochigi (JP);
Mitsugu Kaneko, Tochigi (JP);
Takafumi Ikeda, Tochigi (JP);
Haruhiko Kobayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/233,617

(22) Filed: Sep. 15, 2011

(65) Prior Publication Data
US 2012/0074103 A1 Mar. 29, 2012

(30) Foreign Application Priority Data

Sep. 27, 2010 (JP) ................................. 2010-215480

(51) Int. Cl.
| | | |
|---|---|---|
| B23K 11/06 | (2006.01) | |
| B23K 11/02 | (2006.01) | |
| B23K 9/02 | (2006.01) | |
| B23K 11/08 | (2006.01) | |
| B23K 11/16 | (2006.01) | |
| B23K 11/20 | (2006.01) | |

(52) U.S. Cl.
CPC ............... *B23K 11/08* (2013.01); *B23K 11/061* (2013.01); *B23K 11/16* (2013.01); *B23K 11/20* (2013.01); *B23K 11/06* (2013.01); *B23K 2203/04* (2013.01); *B23K 2203/18* (2013.01)

(58) Field of Classification Search
CPC ...... B23K 13/02; B23K 11/061; B23K 11/04; B23K 11/20; B23K 11/06; B23K 11/063; B23K 11/3036; B23K 2203/04; B23K 2203/18; H05B 6/145

USPC ................... 219/612–614, 619, 102, 104, 18, 219/81–84, 118
See application file for complete search history.

(56) References Cited

U.S. PATENT DOCUMENTS

| | | | | |
|---|---|---|---|---|
| 4,160,146 A | * | 7/1979 | Mundel et al. ................. | 219/58 |
| 4,733,815 A | * | 3/1988 | Sturm ............................ | 228/4.1 |
| 7,833,319 B2 | * | 11/2010 | Bruck et al. .................. | 95/273 |
| 2005/0224467 A1 | * | 10/2005 | Val et al. ........................ | 219/83 |

FOREIGN PATENT DOCUMENTS

JP        2000-005879 A        1/2000

* cited by examiner

*Primary Examiner* — Dana Ross
*Assistant Examiner* — Hemant Mathew
(74) *Attorney, Agent, or Firm* — Carrier Blackman & Associates, P.C.; Joseph P. Carrier; Anne G. Sabourin (57) ABSTRACT

It is an object of the present invention to provide a seam welding warpage prevention method and apparatus capable of preventing warpage caused by cooling contraction after welding, in a case where workpieces are different from one another in material and thickness, and thus not uniform in thermal contraction. In the seam welding warpage prevention method for welding a plurality of workpieces W1 and W2 that are not uniform in thermal contraction with respect to an energizing direction, the workpieces W1 and W2 are clamped with a pair of roller electrodes 23 and 33 while applying current. The welding is performed in a state where the roller electrode 33 that abuts on the workpiece W2 having higher thermal contraction is offset in an advancing direction ahead of the roller electrode 23 that abuts on the workpiece W1 having lower thermal contraction.

3 Claims, 6 Drawing Sheets

SEAM WELDING WARPAGE PREVENTION METHOD AND APPARATUS

This application is based on and claims the benefit of priority from Japanese Patent Application No. 2010-215480, filed on 27 Sep. 2010, the content of which is incorporated herein by reference.

BACKGROUND OF THE INVENTION

1. Field of the Invention

The present invention relates to a seam welding warpage prevention method and apparatus. More particularly the present invention relates to a seam welding warpage prevention method and apparatus for welding a plurality of members to be welded that are not uniform in thermal contraction with respect to an energization direction.

2. Related Art

Conventionally, there is known a technique of seam welding that clamps two or more workpieces (members to be welded) by roller electrodes and moves the roller electrodes while applying pressure and current to the workpieces, so as to continuously weld the workpieces.

SUMMARY OF THE INVENTION

However, the seam welding may cause the workpieces to warp in a longitudinal direction thereof due to cooling contraction immediately after the welding if the workpieces are not uniform in thermal contraction.

Figure 6A:
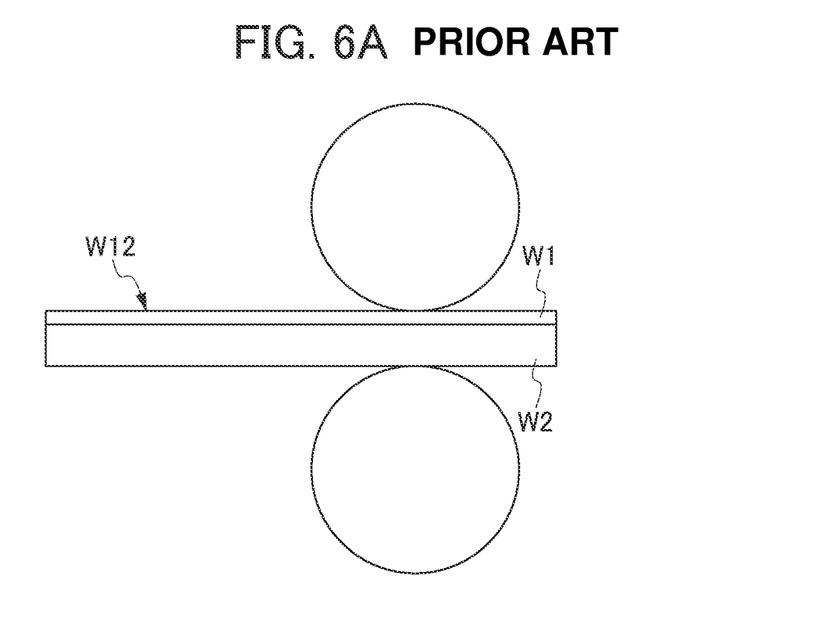
FIG. 6A is an illustration diagram explaining how warpage is generated by the conventional seam welding of two workpieces, each with a different thermal contraction.
Figure 6B:
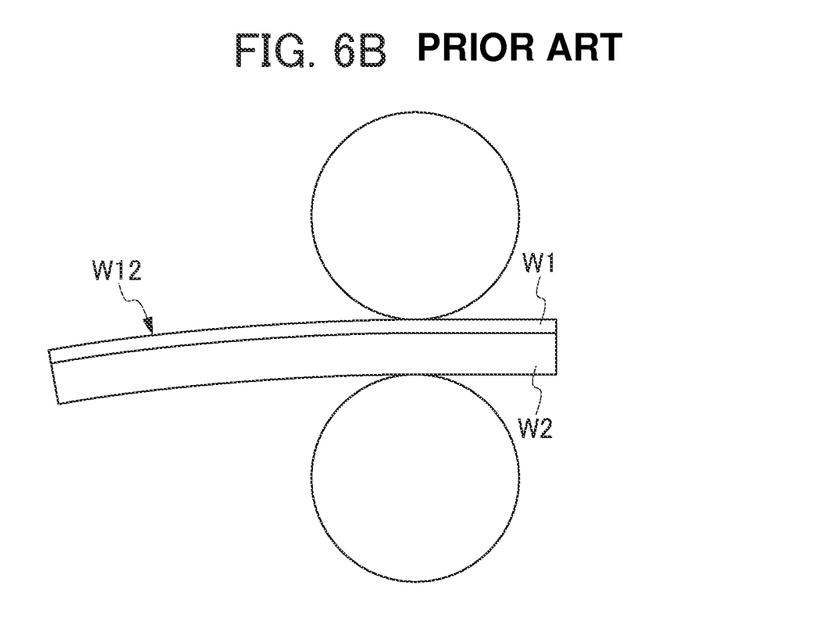
FIG. 6B is an illustration explaining how warpage is generated in a longitudinal direction by conventional seam welding.

For example, as shown in FIG. 6A, if a workpiece W1 having a low thermal contraction and a workpiece W2 having a high thermal contraction are overlapped and seam welded one on top of another, since the workpiece W1 has low cooling contraction and the workpiece W2 has large cooling contraction, a workpiece W12 immediately after being welded warps in a longitudinal direction thereof as shown in FIG. 6B.

For example, in a case in which the workpieces are of different material, thermal contraction generally differs therebetween. Even if the workpieces are of the same material, in a case in which the workpieces are made different in thickness from each other, thermal contraction thereof becomes non-uniform.

If workpieces that are not uniform in thermal contraction due to difference in material or thickness are seam welded to each other, the resultant workpiece warps in a longitudinal direction thereof due to cooling contraction immediately after welding. This warpage causes the welded workpiece to deviate in size and thereby results in failure in subsequent processes of welding and assembly.

The present invention is conceived in view of the above-mentioned problems, and it is an object of the present invention to provide a seam welding warpage prevention method and seam welding warpage prevention apparatus that can prevent warpage from being generated as a result of cooling contraction immediately after welding in a case in which members to be welded are not uniform in thermal contraction due to difference in material or thickness.

A seam welding warpage prevention method according to the present invention is a seam welding warpage prevention method that welds a plurality of members to be welded (for example, workpieces W1, W2, which will be described later) that are not uniform in thermal contraction with respect to an energizing direction, by clamping the members to be welded with a pair of welding electrodes (for example, roller electrodes 23, 33, which will be described later) while applying current. The welding is performed in a state in which, from among the pair of welding electrodes, the welding electrode (for example, roller electrode 33, which will be described later) that abuts on the member to be welded (for example, workpiece W2, which will be described later) having higher thermal contraction is offset in an advancing direction ahead of the welding electrode (for example, roller electrode 23, which will be described later) that abuts on the member to be welded (for example, workpiece W1, which will be described later) having lower thermal contraction.

According to the present invention, welding is performed in a state in which one welding electrode that abuts on a member to be welded that has higher thermal contraction, is offset in an advancing direction ahead of the other welding electrode that abuts on a member to be welded that has lower thermal contraction.

With this, it is possible to apply an external force on the welding workpieces in a direction suppressing warpage generated by cooling contraction and to cancel out the warpage before it occurs, thereby preventing the warpage from occurring.

A seam welding warpage prevention apparatus according to the present invention is a seam welding warpage prevention apparatus (for example, seam welding warpage prevention apparatus 1, which will be described later) that welds a plurality of members to be welded (for example, workpieces W1, W2, which will be described later) that are not uniform in thermal contraction with respect to an energizing direction. The seam welding warpage prevention apparatus includes a pair of welding electrodes (for example, roller electrodes 23, 33, which will be described later) that perform welding by clamping the members to be welded therebetween and applying current; and an offset mechanism (offset mechanism 40) that offsets, from among the pair of welding electrodes, the welding electrode (for example, a roller electrode 33, which will be described later) that abuts on the member to be welded (for example, workpiece W2, which will be described later) having higher thermal contraction in an advancing direction ahead of the welding electrode (for example, a roller electrode 23, which will be described later) that abuts on the member to be welded (for example, workpiece W1, which will be described later) having lower thermal contraction.

According to the present invention, it is possible to obtain the same effect as described above.

According to the present invention, it is possible to apply an external force on the welding workpieces in a direction suppressing warpage generated by cooling contraction and to cancel out the warpage before it occurs, thereby preventing the warpage from occurring.

DETAILED DESCRIPTION OF THE INVENTION

The following describes embodiments of the present invention with reference to the drawings.

Figure 1A:
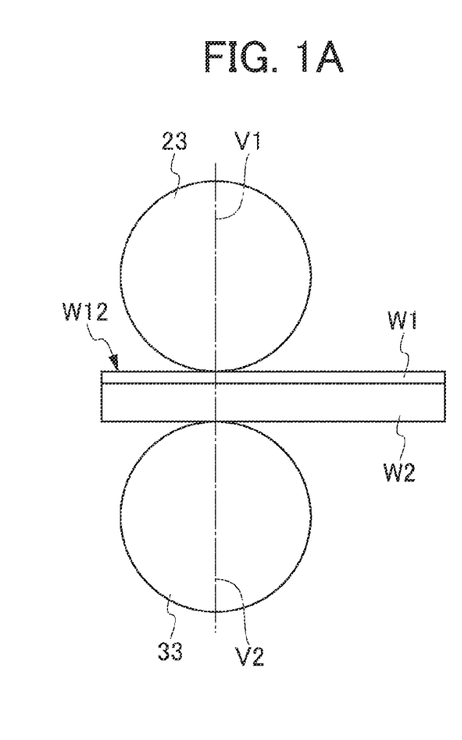
FIG. 1a-c are illustrative diagrams showing one embodiment of a seam welding warpage prevention method according to the present invention.
Figure 1B:
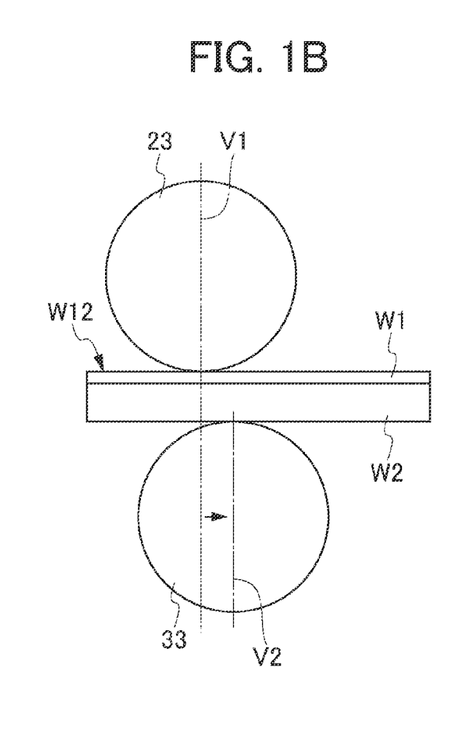
Figure 1C:
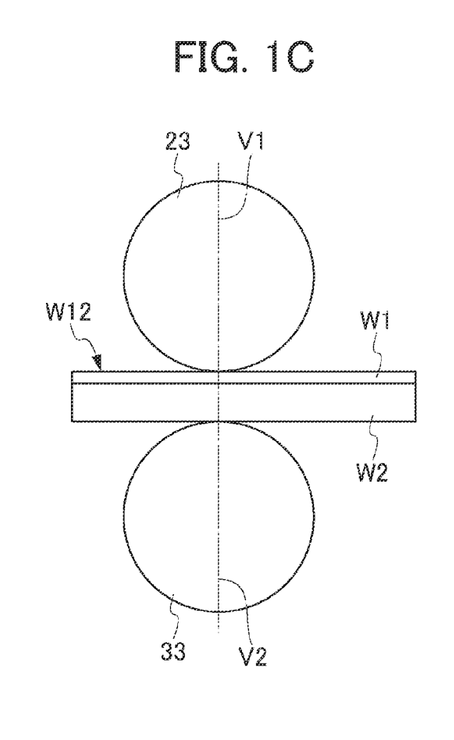

FIG. 1 is an illustration diagram showing one embodiment of a seam welding warpage prevention method according to the present invention.

In the present seam welding warpage prevention method, seam welding is performed in such a manner that a plurality of workpieces W1 and W2, which are not uniform in thermal contraction with respect to an energization direction, are clamped between a pair of roller electrodes 23 and 33, and current is applied to the roller electrodes 23 and 33.

At this time, the welding is performed in a state that, among the roller electrodes 23 and 33, the roller electrode 33 that abuts on the workpiece W2 having higher thermal contraction, is offset in an advancing direction ahead of the roller electrode 23 that abuts on the workpiece W1 having lower thermal contraction.

Before the start of the welding, the roller electrodes 23 and 33 are positioned as shown in FIG. 1A.

This means that the roller electrodes 23 and 33 are positioned so that a vertical line V1 passing through a rotation axis of the roller electrode 23 on the side of the workpiece W1 coincides with a vertical line V2 passing through a rotation axis of the roller electrode 33 on the side of the workpiece W2.

Meanwhile, the workpieces W1 and W2 are clamped between the roller electrodes 23 and 33.

Either of the roller electrodes 23 and 33 may be positioned first. Likewise, either of the workpieces W1 and W2 may be clamped first.

When preparation for starting the welding is complete, welding current is applied between the roller electrodes 23 and 33, and the seam welding is started.

Immediately after the seam welding is started, the roller electrode 33 on the side of the workpiece W2 is displaced, i.e., offset in an advancing direction ahead of the roller electrode 23 on the side of the workpiece W1.

The offset amount at this time is set to, for example, a distance between 0 to 5 mm as appropriate, based on the difference in thermal contraction between the workpieces W1 and W2 and the moving speed of the seam welding.

The seam welding is performed while maintaining the state in which the roller electrode 33 is offset in the advancing direction ahead of the roller electrode 23.

Among the workpieces W1 and W2 subject to the seam welding, the workpiece W2 has higher thermal contraction than the workpiece W1. Therefore, in ordinary circumstances, immediately after the welding, the workpiece W12 tends to bend downward due to cooling contraction.

However, since the lower roller electrode 33 is offset in the advancing direction ahead of the upper roller electrode 23, the lower roller electrode 33 holds the workpiece W12 in a manner so as to push up the workpiece W12.

It is assumed that the offset amount of the roller electrode 33 has been set so that the above described force of the roller electrode 33 pushing up the workpiece W12 cancels out the force of the workpiece W12 bending downward due to cooling contraction.

In this way, warpage generated by cooling contraction of the workpiece W12 is cancelled out before it occurs. As a result, the warpage is prevented from occurring, and the workpiece W12 is welded straight without warpage after cooling.

When the roller electrode 33 reaches a predetermined welding end position, as shown in FIG. 1C, the roller electrode 33 is stopped at the position, and the roller electrode 23 is continuously moved up to, and then, stopped at the same position as the roller electrode 33.

With this, the seam welding ends.

According to the embodiment described above, it is possible to obtain the following effect.

(1) The welding is performed in a state in which the roller electrode 33 that abuts on the workpiece W2 having higher thermal contraction is offset in an advancing direction ahead of the roller electrode 23 that abuts on the workpiece W1 having lower thermal contraction.

With this, it is possible to apply an external force on the welding workpieces in a direction of suppressing warpage generated by cooling contraction and cancel out the warpage before it occurs, thereby preventing the warpage from occurring.

First Embodiment

Figure 2:
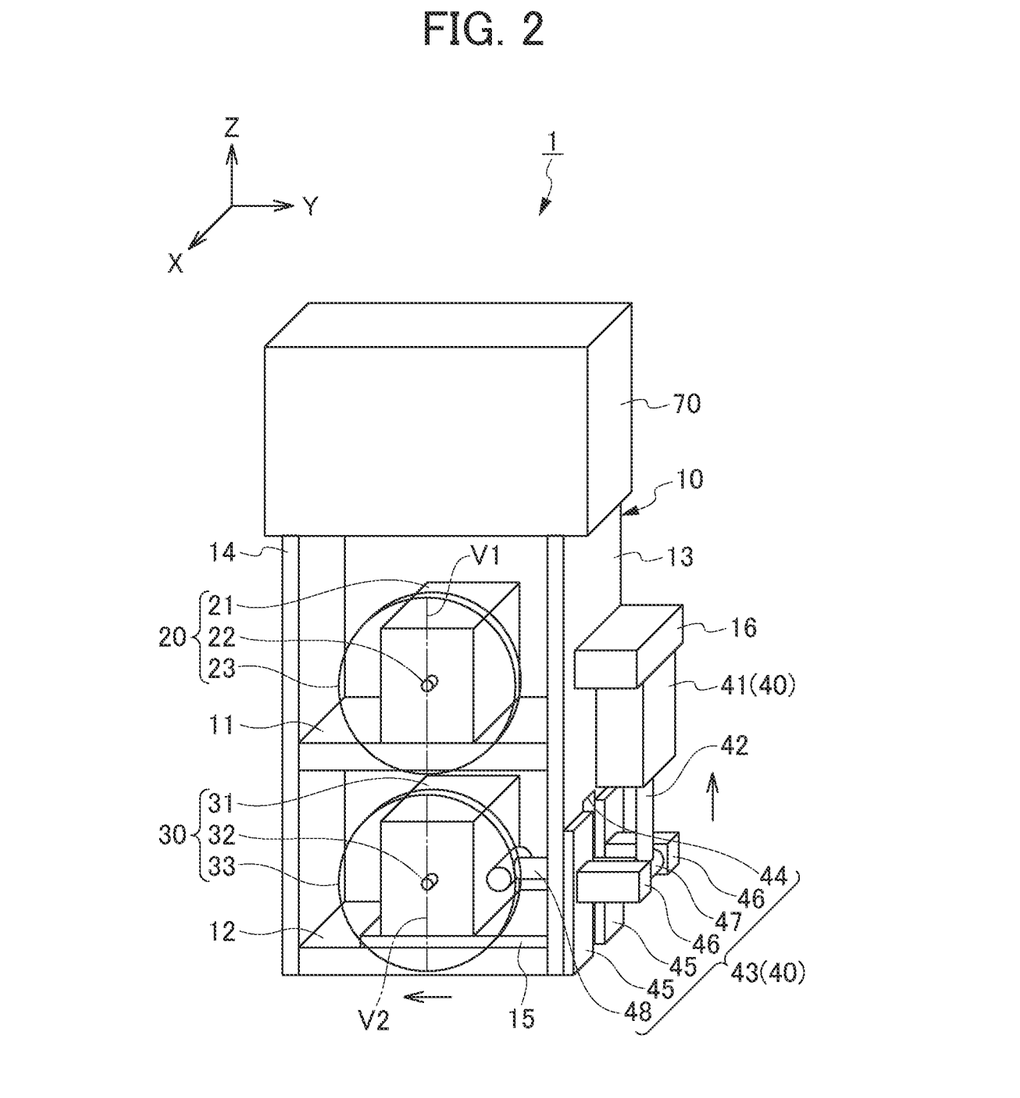
FIG. 2 is a schematic perspective view showing a state in which welding electrodes of the seam welding warpage prevention apparatus according to a first embodiment of the present invention are in a normal position.
Figure 3:
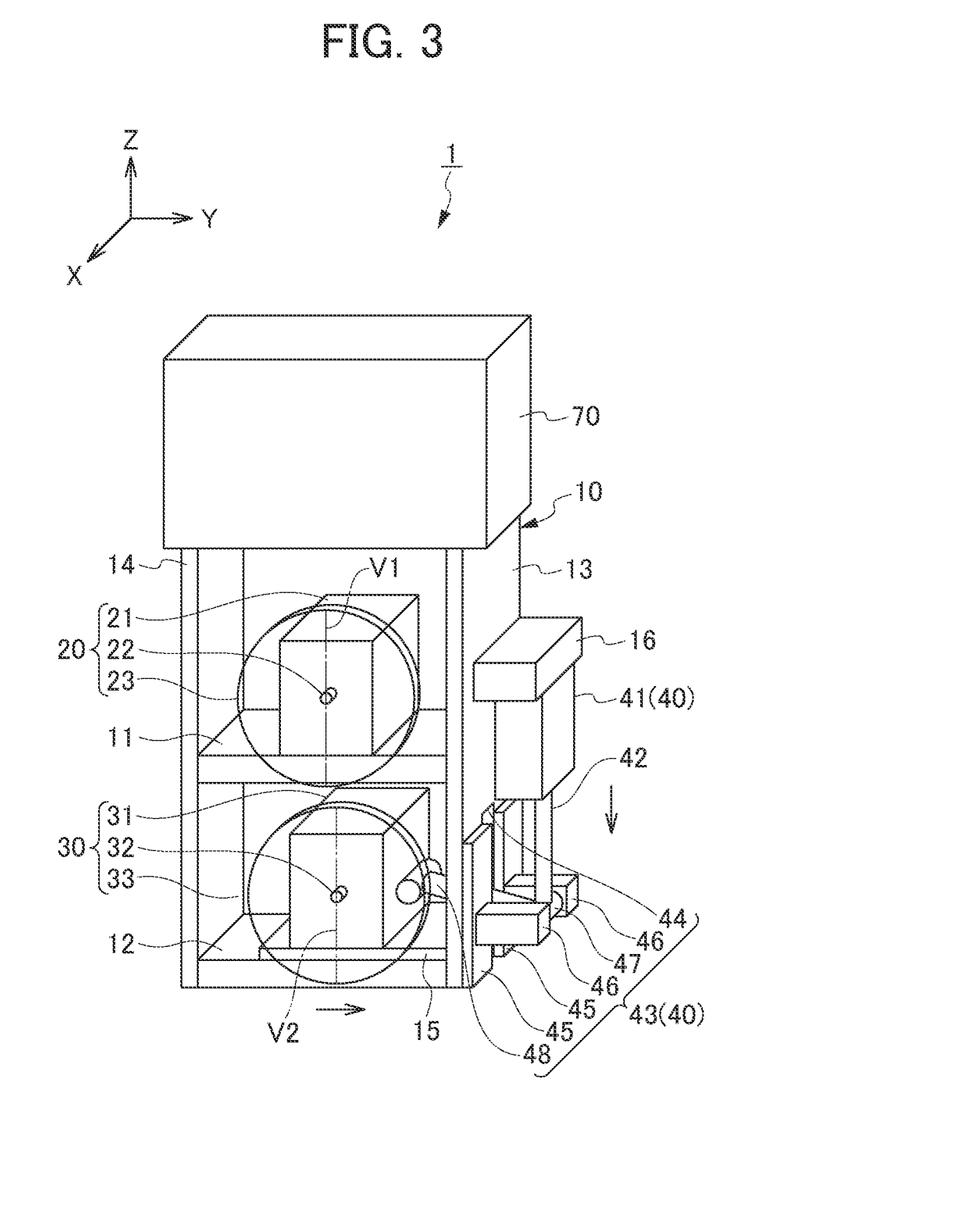
FIG. 3 is a schematic perspective view showing a state in which the welding electrodes of the seam welding warpage prevention apparatus according to the first embodiment of the present invention have been displaced to an offset position.

FIGS. 2 and 3 are schematic perspective views showing a seam welding warpage prevention apparatus 1 according to a first embodiment of the present invention.

The seam welding warpage prevention apparatus 1 is provided with a chassis 10, a pair of welding electrodes 20 and 30 supported by the chassis 10, an offset mechanism 40, and a transformer 70.

The chassis 10 is provided so that the welding electrodes 20 and 30, the offset mechanism 40 and the transformer 70 are mounted in a predetermined positional relationship. For convenience, in FIGS. 2 and 3, it is assumed that the arrow X is directed in a forward direction from the back of the chassis 10, the arrow Y is directed in a rightward direction from the left of the chassis 10, and the direction of the arrow Z is directed in an upward direction from the bottom of the chassis 10.

More specifically, the chassis 10 includes an upper mounting unit 11 to mount the welding electrode 20, a lower mounting unit 12 to mount the welding electrode 30, a side plate 13 to mount the offset mechanism 40, and an upper end portion 14 to mount the transformer 70.

Either one of the chassis 10 and the workpieces such as the two workpieces W1 and W2 (see FIG. 1) is moved in a predetermined direction as the seam welding proceeds.

In a case in which the chassis 10 is moved rightward, the chassis 10 is supported by a driving mechanism (not shown). When the seam welding is performed, the driving mechanism operates to cause the chassis 10 to move rightward.

In a case in which the two workpieces W1 and W2 are moved leftward, the workpieces W1 and W2 are held by a workpiece driving mechanism (not shown). When the seam welding is performed, the workpiece driving mechanism operates to cause the workpieces W1 and W2 to move leftward.

The welding electrodes 20 and 30 are arranged to perform welding by clamping the two workpieces W1 and W2 (see FIG. 1) therebetween while applying current.

The upper welding electrode 20 includes an electrode holding unit 21, a rotation axis 22 protruding from the electrode holding unit 21, and a roller electrode 23 fixedly mounted at the tip of the rotation axis 22.

The electrode holding unit 21 is mounted on the upper mounting unit 11 of the chassis 10. The rotation axis 22 protrudes forward from the upper mounting unit 11, and the roller electrode 23 is mounted in front of the chassis 10.

The electrode holding unit 21 holds the roller electrode 23 so that it is rotatable via the rotation axis 22 and controls current applied to the roller electrode 23. When the current is applied, the electrode holding unit 21 applies high voltage boosted by the transformer 70 to the roller electrode 23 via the rotation axis 22.

The lower welding electrode 30 includes an electrode holding unit 31, a rotation axis 32 protruding from the electrode holding unit 31, and a roller electrode 33 fixedly mounted at the tip of the rotation axis 32.

The electrode holding unit 31 is mounted on the lower mounting unit 12 of the chassis 10 via a linear guide 15. The linear guide 15 is mounted on the lower mounting unit 12 and includes a slider (not shown). The electrode holding unit 31 is integrally mounted on the slider of the linear guide 15. The linear guide 15 holds the electrode holding unit 31 so that it is movable in left and right directions of the chassis 10. The rotation axis 32 protrudes forward from the lower mounting unit 12, and the roller electrode 33 is mounted in front of the chassis 10.

The electrode holding unit 31 holds the roller electrode 33 so that it is rotatable via the rotation axis 32 and applies current from the upper roller electrode 23 to the lower roller electrode 33. This means that, when welding current is applied to the upper roller electrode 23, the welding current flows from the upper roller electrode 23 to the lower roller electrode 33 via the workpieces W1 and W2 that are clamped between the roller electrodes 23 and 33.

The offset mechanism 40 is provided for offsetting the lower roller electrode 33 that abuts on the workpiece W2 having higher thermal contraction among the two workpieces W1 and W2, in an advancing direction ahead of the upper roller electrode 23 that abuts on the workpiece W1 having lower thermal contraction.

The offset mechanism 40 includes a motor 41 mounted on the side plate 13 and a transmission mechanism 43 that transmits the drive force from the motor 41 to the lower electrode holding unit 31.

The motor 41 is mounted downward on a motor mounting unit 16 of the side plate 13 and includes a rod 42 extending downward. When the motor 41 drives in one direction, the rod 42 moves downward, and when the motor 41 drives in the opposite direction, the rod 42 moves upward.

As the motor 41, a linear motor may be employed, or a combined unit of a rotating motor and a ball screw may be employed. Also, in place of the electric motor, a fluid pressure cylinder may be employed.

The transmission mechanism 43 includes a pair of linear guides 45 and 45, being mounted on both sides of a through hole 44 formed on the side plate 13 of the chassis 10, and a tilting rod 48.

The linear guides 45 and 45 support sliders 46 and 46 so that they are movable along upward and downward directions. The sliders 46 and 46 are connected to each other by way of a coupling rod 47 extending back and forth. The lower end portion of the rod 42 of the motor 41 is attached to the center of the coupling rod 47.

With this, when the rod 42 is driven by the motor 41 to move upward and downward, the sliders 46 and 46 of the linear guides 45 and 45 move upward and downward as well.

The tilting rod 48 has one end attached to the lower electrode holding unit 31, and the other end attached to the coupling rod 47.

More specifically, the one end of the tilting rod 48 is attached to a side of the electrode holding unit 31 to be tiltable around a shaft line (not shown) extending back and forth.

The other end of the tilting rod 48 is attached to the coupling rod 47 to be tiltable around a shaft line (not shown) extending back and forth.

With this, when the sliders 46 and 46 of the linear guides 45 and 45 move upward and downward driven by the motor 41 via the rod 42, the lower electrode holding unit 31 moves in the left and right direction via the tilting rod 48.

More specifically, as shown in FIG. 3, when the motor 41 drives in one direction to move the rod 42 downward, the sliders 46 and 46 of the linear guides 45 and 45 move downward, the right end portion of the tilting rod 48 moves downward, the left end portion thereof moves rightward, and thereby the lower electrode holding unit 31 moves rightward.

As shown in FIG. 2, when the motor 41 drives in the opposite direction to move the rod 42 upward, the sliders 46 and 46 of the linear guides 45 and 45 move upward, the right end portion of the tilting rod 48 moves upward, the left end portion thereof moves leftward, and thereby the lower electrode holding unit 31 moves leftward.

The seam welding warpage prevention apparatus 1 configured as described above operates as follows.

Before the welding starts, as shown in FIG. 2, the lower electrode holding unit 31 is positioned against the lower mounting unit 12 of the chassis 10 so that the vertical line V1 passing through the rotation axis 22 of the upper roller electrode 23 coincides with the vertical line V2 passing through the rotation axis 32 of the lower roller electrode 33 in a disposition such that the upward and downward directions of the chassis 10 are aligned to a vertical direction.

As workpieces subject to the welding, for example, two workpieces are clamped between the upper roller electrode 23 and the lower roller electrode 33 in the state described above.

Here, among the two workpieces, the workpiece W2 having relatively higher thermal contraction due to thickness or material thereof is placed on the lower side, and the workpiece W1 having relatively lower thermal contraction is placed on the upper side.

As described above, in the state in which the vertical line V1 passing through the rotation axis 22 of the upper roller electrode 23 coincides with the vertical line V2 passing through the rotation axis 32 of the lower roller electrode 33, welding current is applied between the roller electrodes 23 and 33, and thereby the seam welding is started.

At the start of the seam welding, upon applying the welding current, the offset mechanism 40 is firstly operated to move the lower electrode holding unit 31 rightward against the lower mounting unit 12 of the chassis 10, as shown in FIG. 3. Here, the moving amount is set to, for example, a distance between 0 to 5 mm as appropriate.

More specifically, the motor 41 is driven in one direction to move the rod 42 downward, thereby the right end portion of the tilting rod 48 moves downward, and the lower electrode holding unit 31 moves rightward.

With this, the vertical line V2 passing through the rotation axis 32 of the lower roller electrode 33 is displaced, i.e., offset in the advancing direction of the roller electrodes 23 and 33 ahead of the vertical line V1 passing through the rotation axis 22 of the upper roller electrode 23 (see FIG. 3).

After the offset mechanism 40 has offset the lower roller electrode 33 ahead in the advancing direction, the roller electrodes 23 and 33 are moved rightward along with the chassis 10 at a predetermined speed while maintaining the offset state, and the seam welding is continued.

When the two workpieces W1 and W2 are welded together in such a manner that the workpiece W1 having relatively lower thermal contraction is placed on the upper side and the lower workpiece W2 having relatively higher thermal contraction is placed on the lower side, the workpieces W1 and W2 are supported by the lower roller electrode 33 that is offset in the advancing direction ahead of the upper roller electrode 23 so that the force bending the workpiece W12 downward due to cooling contraction immediately after the welding, is pushed upwards from underneath.

This means that the force of the lower roller electrode 33 pushing up the workpiece W12 from underneath cancels out the force of the workpiece W12 bending downward due to cooling contraction. As a result of this, the workpiece W12 is welded straight without warpage after cooling.

When the lower roller electrode 33 reaches a predetermined welding end position, the lower roller electrode 33 is stopped at the welding end position. On the other hand, the upper roller electrode 23 is continuously moved up to the predetermined welding end position.

More specifically, when the lower roller electrode 33 reaches the predetermined welding end position, the offset mechanism 40 is operated in the opposite direction to have the lower electrode holding unit 31 moved leftward against the lower mounting unit 12 of the chassis 10. Here, the leftward moving speed is set approximately equal to the speed of the roller electrodes 23 and 33 moving rightward along with the chassis 10 in a predetermined speed.

As a result of this, the lower roller electrode 33 apparently remains still at the predetermined welding end position without moving leftward or rightward.

When the upper roller electrode 23 reaches the predetermined welding end position as if catching up to the lower roller electrode 33 which remains still, the seam welding ends.

According to the first embodiment, it is possible to obtain the following effect.

(2) The offset mechanism 40 offsets the roller electrode 33 that abuts on the workpiece W2 having higher thermal contraction, in the advancing direction ahead of the roller electrode 23 that abuts on the workpiece W1 having lower thermal contraction. Then, welding is performed while maintaining such an offset state.

With this, it is possible to apply an external force against the welding workpiece W12 in a direction of suppressing warpage generated by cooling contraction and to cancel out the warpage before it occurs, thereby preventing the warpage from occurring.

Second Embodiment

Figure 4:
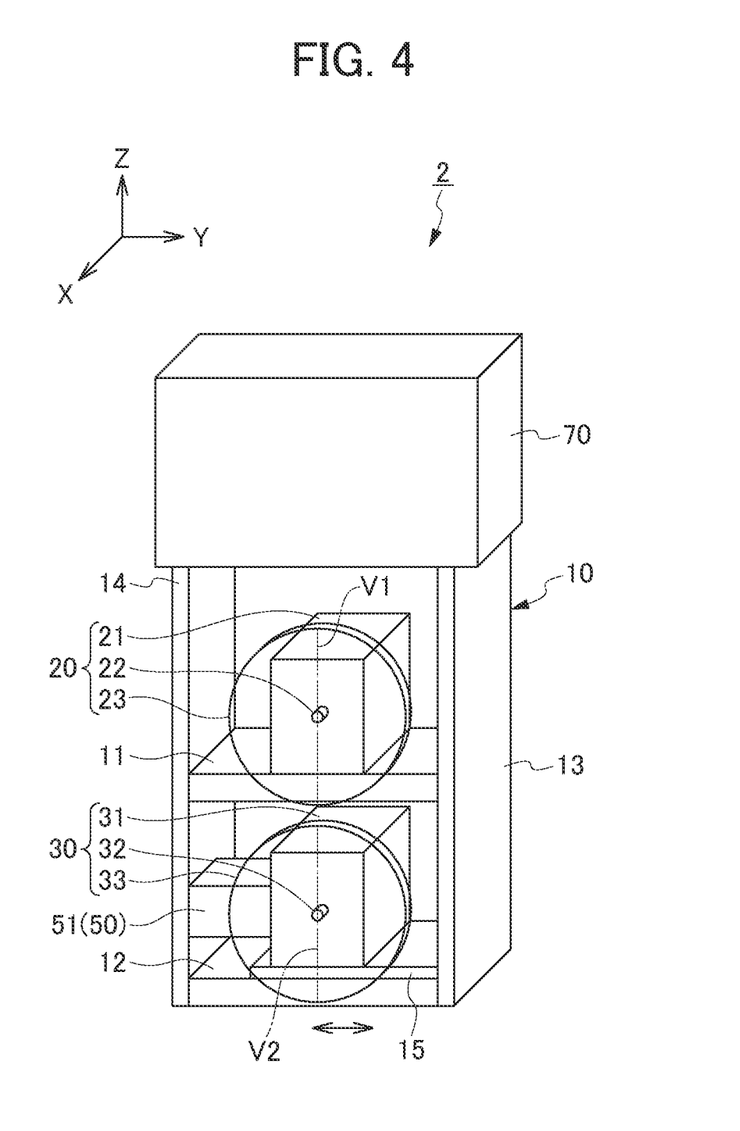
FIG. 4 is a schematic perspective view showing a state in which welding electrodes of a seam welding warpage prevention apparatus according to a second embodiment of the present invention are in a normal position.

FIG. 4 is a schematic perspective view showing a seam welding warpage prevention apparatus 2 according to a second embodiment of the present invention.

The seam welding warpage prevention apparatus 2 is provided with a chassis 10, a pair of welding electrodes 20 and 30 supported by the chassis 10, an offset mechanism 50, and a transformer 70.

Since, constituent elements of the seam welding warpage prevention apparatus 2 according to the second embodiment are the same as those of the seam welding warpage prevention apparatus 1 according to the first embodiment except for the offset mechanism 50, descriptions of the same constituent elements are omitted.

As the offset mechanism 50, for example, a small sized actuator 51 is mounted between the side plate 13 of the chassis 10 and a side portion of the electrode holding unit 31 of the lower welding electrode 30. The actuator extends when current is applied and returns to its original state when no current is applied. As such a kind of actuator, for example, a piezo actuator can be used in which a required number of piezo elements are stacked.

Such a seam welding warpage prevention apparatus 2 can weld workpieces straight while preventing warpage, similar to the seam welding warpage prevention apparatus 1.

According to the second embodiment, in addition to the above described effect (2), it is possible to obtain the following effect.

(3) In comparison to the offset mechanism 40 of the first embodiment, the offset mechanism 50 can be configured to be simpler and smaller.

Third Embodiment

Figure 5:
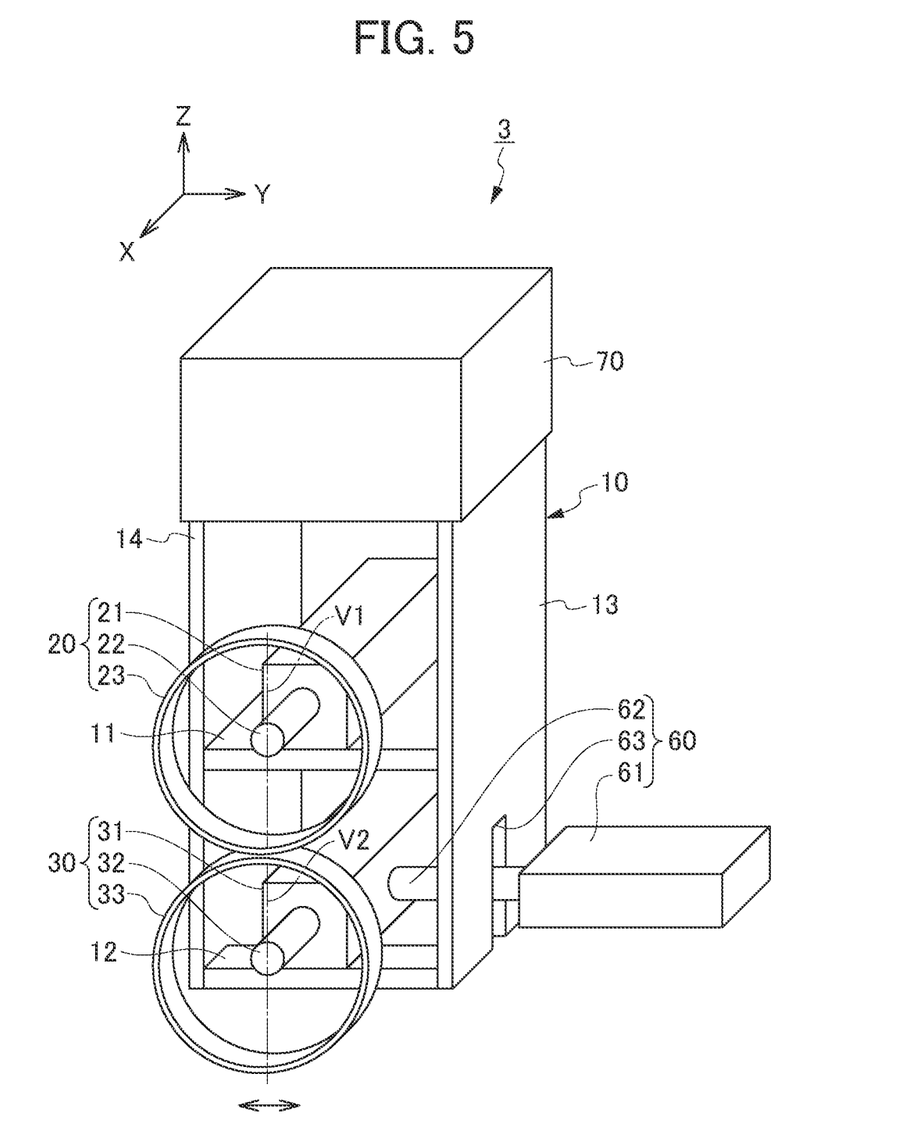
FIG. 5 is a schematic perspective view showing a state in which welding electrodes of a seam welding warpage prevention apparatus according to a third embodiment of the present invention are in a normal position.

FIG. 5 is a schematic perspective view showing a seam welding warpage prevention apparatus 3 according to a third embodiment of the present invention.

The seam welding warpage prevention apparatus 3 is provided with a chassis 10, a pair of welding electrodes 20 and 30 supported by the chassis 10, an offset mechanism 60, and a transformer 70.

Since, constituent elements of the seam welding warpage prevention apparatus 3 according to the third embodiment are the same as those of the seam welding warpage prevention apparatus 1 according to the first embodiment except for the offset mechanism 60, descriptions of the same constituent elements are omitted.

The offset mechanism 60 includes a motor 61. The motor 61 includes a rod 62 extending through a through hole 63 formed on the side plate 13 of the chassis 10. The end portion of the rod 62 is attached to the side portion of the electrode holding unit 31.

When the motor 61 is driven in one direction, the rod 62 moves rightward, and the electrode holding unit 31 also moves rightward.

When the motor 61 drives in the opposite direction, the rod 62 moves leftward, and the electrode holding unit 31 also moves leftward.

As the motor 61, a linear motor may be employed, or a combined unit of a rotating motor and a ball screw may be employed. Also, in place of the electric motor, a fluid pressure cylinder may be employed.

Such a seam welding warpage prevention apparatus 3 can weld workpieces straight while preventing warpage, similar to the seam welding warpage prevention apparatus 1.

According to the third embodiment, in addition to the above described effect (2), it is possible to obtain the following effect.

(4) In comparison to the offset mechanism 40 of the first embodiment, the offset mechanism 60 can be configured to be simpler.

Other Embodiments

Though not illustrated, the seam welding warpage prevention apparatus 1, 2, or 3 can be applied to a welding robot.

In a case in which the seam welding warpage prevention apparatus 1, 2, or 3 is applied to an appropriate movable portion of a welding robot, the offset mechanism 40, 50, or 60 is no longer required.

In such a case, in the seam welding warpage prevention apparatus 1, 2, or 3, the lower electrode holding unit 31 is mounted on the lower mounting unit 12 of the chassis 10 in a position such that the vertical line V2, passing through the rotation axis 32 of the lower roller electrode 33, coincides with the vertical line V1, passing through the rotation axis 22 of the upper roller electrode 23 in a disposition such that the upward and downward directions of the chassis 10 are aligned to the vertical direction.

The chassis 10 is directly or indirectly fixed to the movable portion of the welding robot, in such a state.

The movable portion of the welding robot may be tilted so as to have the vertical line V2, passing through the rotation axis 32 of the lower roller electrode 33 offset, in the advancing direction ahead of the vertical line V1, passing through the rotation axis 22 of the upper roller electrode 23.

This means that a lower part of a line passing through the rotation axis 22 of the upper roller electrode 23 and the rotation axis 32 of the lower roller electrode 33 may be tilted in the advancing direction of the roller electrodes 23 and 33 ahead of the upper part of the line.

In the embodiments described above, it has been described that, among the two workpieces, the workpiece W2 having relatively higher thermal contraction due to thickness or material thereof is placed on the lower side, and the workpiece W1 having relatively lower thermal contraction is placed on the upper side. However, the present invention is not limited thereto.

For example, if the configuration is such that the vertical line V1 passing through the rotation axis 22 of the upper roller electrode 23 is offset in the advancing direction of the roller electrodes 23 and 33 ahead of the vertical line V2 passing through the rotation axis 32 of the lower roller electrode 33, among the two workpieces W1 and W2, the workpiece W2 having relatively higher thermal contraction due to thickness or material thereof can be placed on the upper side, and the workpiece W1 having relatively lower thermal contraction can be placed on the lower side, respectively.

The same applies to a case in which the movable portion of the welding robot is utilized in place of the offset mechanism 40, 50, or 60.

Furthermore, in the embodiments described above, although the two workpieces W1 and W2 have been illustrated as examples of members to be welded, the present invention is not limited thereto.

For example, the same applies to a case of seam welding with three or more workpieces W1, W2, W3 . . . as members to be welded.

More specifically, in such a case, for example, the roller electrode 33 that abuts on a workpiece having higher thermal contraction among two of the outermost workpieces can be offset in the advancing direction ahead of the roller electrode 23 that abuts on the other workpiece having lower thermal contraction.

Furthermore, for example, when all of the workpieces are overlapped in a predetermined order, the roller electrode 33 that abuts on the outermost workpiece on the side having higher overall thermal contraction, can be offset in the advancing direction ahead of the roller electrode 23 that abuts on the outermost workpiece on the side having lower overall thermal contraction.

The same applies to a case in which the movable portion of the welding robot is utilized in place of the offset mechanism 40, 50, or 60.

As material of the workpieces, the following examples can be given, and various other combinations are possible.

(1) Seam welding of a workpiece 1 (JAC270, thickness: 0.6 mm) and a workpiece 2 (JAC590, thickness: 1.8 mm).

(2) Seam welding of a workpiece 3 (JAC270, thickness: 0.7 mm) and a workpiece 4 (JAC780, thickness: 1.2 mm).

(3) Seam welding of a workpiece 5 (JAC270, thickness: 0.6 mm), a workpiece 6 (JAC590, thickness: 1.8 mm), and a workpiece 7 (JAC590, thickness: 1.8 mm).

What is claimed is:

1. A seam welding warpage prevention apparatus comprising:
   a pair of welding electrodes for clamping the members to be welded that are not uniform in thermal contraction with respect to an energization direction due to difference in material or thickness there between while applying pressure and current to the members;
   a current supply means; and
   an offset mechanism
   wherein the welding electrodes are roller electrodes and each of the pair of welding electrodes include an electrode holding unit, a rotation axis protruding from the electrode unit, and a roller electrode fixedly mounted at the tip of the rotation axis,
   wherein the offset mechanism includes a motor or a fluid pressure cylinder, and a transmission mechanism that transmits a drive force from the motor or the fluid pressure cylinder to the electrode holding unit that is included in one of the pair of welding electrodes,
   wherein the offset mechanism offsets, from among the pair of welding electrodes, a welding electrode that abuts on one of the members to be welded having a higher thermal contraction in an advancing direction ahead of a welding electrode that abuts on one of the members to be welded having a lower thermal contraction, and
   wherein the offset mechanism affects the electrode abutting the member to be welded having higher thermal contraction, so that a vertical line through the rotation axis of said electrode advances in a direction ahead of a vertical line through the rotation axis of the electrode abutting the member with lower thermal contraction.

2. The seam welding warpage prevention apparatus according to claim 1,
   wherein, in the state in which the vertical line passing through the rotation axis of the roller electrode that abuts on one of the members to be welded having higher thermal contraction coincides with the vertical line passing through the rotation axis of the roller electrode that abuts on one of the members to be welded having lower thermal contraction, welding current is applied between both electrodes by means of the current supply means, and thereby the seam welding is started; and
   at the start of the welding, the offset mechanism moves the electrode holding unit, and thereby offsets the roller electrode that abuts on one of the members to be welded having higher thermal contraction in the advancing direction of both roller electrodes.

3. The seam welding warpage prevention apparatus according to claim 2,
   wherein, when the roller electrode that abuts on one of the members to be welded having higher thermal contraction reaches a predetermined welding end position, the roller electrode that abuts on one of the members to be welded having higher thermal contraction is stopped at the welding end position, as well as the electrode holding unit is moved in a direction opposite to the advancing direction of both of the roller electrodes by means of the offset mechanism and, thereby, the roller electrode that abuts on one of the members to be welded having lower thermal contraction is continuously moved up to the predetermined welding end position; and when the roller electrode that abuts on one of the members to be welded having lower thermal contraction reaches the predetermined welding end position as if catching up to the roller electrode that abuts on one of the members to be welded having higher thermal contraction, the seam welding is ended by means of the current supply means.

\* \* \* \* \*